United States Patent
Min et al.

(10) Patent No.: US 8,667,983 B2
(45) Date of Patent: Mar. 11, 2014

(54) RELIEF VALVE FOR OIL PUMP

(75) Inventors: Doogie Min, Suwon-si (KR); Seokjun Yoon, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 152 days.

(21) Appl. No.: 13/239,022

(22) Filed: Sep. 21, 2011

(65) Prior Publication Data

US 2012/0103447 A1    May 3, 2012

(30) Foreign Application Priority Data

Oct. 28, 2010   (KR) .................. 10-2010-0105718

(51) Int. Cl.
*F16K 49/00*   (2006.01)

(52) U.S. Cl.
USPC ...... 137/341; 137/468; 137/538; 137/625.25; 137/526; 236/93 A; 251/11

(58) Field of Classification Search
USPC .................. 137/526, 529, 538, 565.35, 468, 137/625.25, 334, 341; 236/93 A; 251/11
See application file for complete search history.

(56) References Cited

U.S. PATENT DOCUMENTS

| | | | | |
|---|---|---|---|---|
| 2,411,930 | A | * | 12/1946 | Mathys .......................... 137/470 |
| 2,644,480 | A | * | 7/1953 | Earle et al. ..................... 137/469 |
| 2004/0226613 | A1 | | 11/2004 | Ono |
| 2006/0185737 | A1 | * | 8/2006 | Williamson et al. .......... 137/538 |

FOREIGN PATENT DOCUMENTS

| | | |
|---|---|---|
| JP | 57-54781 A | 4/1982 |
| JP | 2-95711 A | 4/1990 |
| JP | 5-195742 A | 8/1993 |
| JP | 5-195743 A | 8/1993 |
| JP | 2004-232670 A | 8/2004 |
| KR | 0182110 B1 | 12/1998 |
| KR | 10-0222721 B1 | 10/1999 |
| KR | 10-0245757 B1 | 4/2000 |
| KR | 10-0783883 B1 | 12/2007 |

* cited by examiner

*Primary Examiner* — Kevin Lee
*Assistant Examiner* — Macade Brown
(74) *Attorney, Agent, or Firm* — Morgan, Lewis & Bockius LLP (57) ABSTRACT

A relief valve for an oil pump can prevent a main gallery from being damaged by largely decreasing peak pressure of an oil pump by using bypass flow according to oil pressure of the main gallery in cold start of an engine, and can control the discharging pressure of the oil pump at the optimum level when the engine is warmed up, by defining a housing chamber communicating with the main gallery of the engine and a plunger chamber bypassing some of oil flowing to the main gallery to the oil pump or an oil pan in accordance with oil pressure in the housing chamber using a plunger chamber, and by changing a modulus of elasticity of a coil spring elastically supporting the plunger in accordance with the oil pressure produced in the main gallery, by using a substance that is expanded by temperature.

8 Claims, 7 Drawing Sheets

RELIEF VALVE FOR OIL PUMP

CROSS-REFERENCE TO RELATED APPLICATIONS

The present application claims priority to Korean Patent Application Number 10-2010-0105718 filed Oct. 28, 2010, the entire contents of which application is incorporated herein for all purposes by this reference.

BACKGROUND OF INVENTION

1. Field of Invention

The present invention relates to a relief valve for an oil pump, and more particularly, to a relief valve for an oil pump that can control oil pressure at the optimum level such that the main gallery is not damaged, and considerably decrease peak pressure in cold start.

2. Description of Related Art

In general, oil pumps are device that suck oil stored in an oil pan and supply the oil to parts to lubricate.

The oil pumped up to an oil pump increases in pressure inside the oil pump and the oil that is discharged under high pressure from the oil pump may impact or damage an oil filter or a lubrication circuit.

Therefore, a relief valve that keeps the pumped oil at appropriated pressure is disposed at the oil outlet of the oil pump.

The relief valve keeps the oil-discharging pressure of the oil pump at an appropriate level and particularly prevents the main gallery from being damaged by high oil-discharging pressure by making bypass flow that returns some of the oil discharged from the oil pump to the oil pump or the oil pan, when the discharging pressure of the oil discharged from the oil pump to the main gallery of the engine increases above appropriate pressure.

Figure 6:
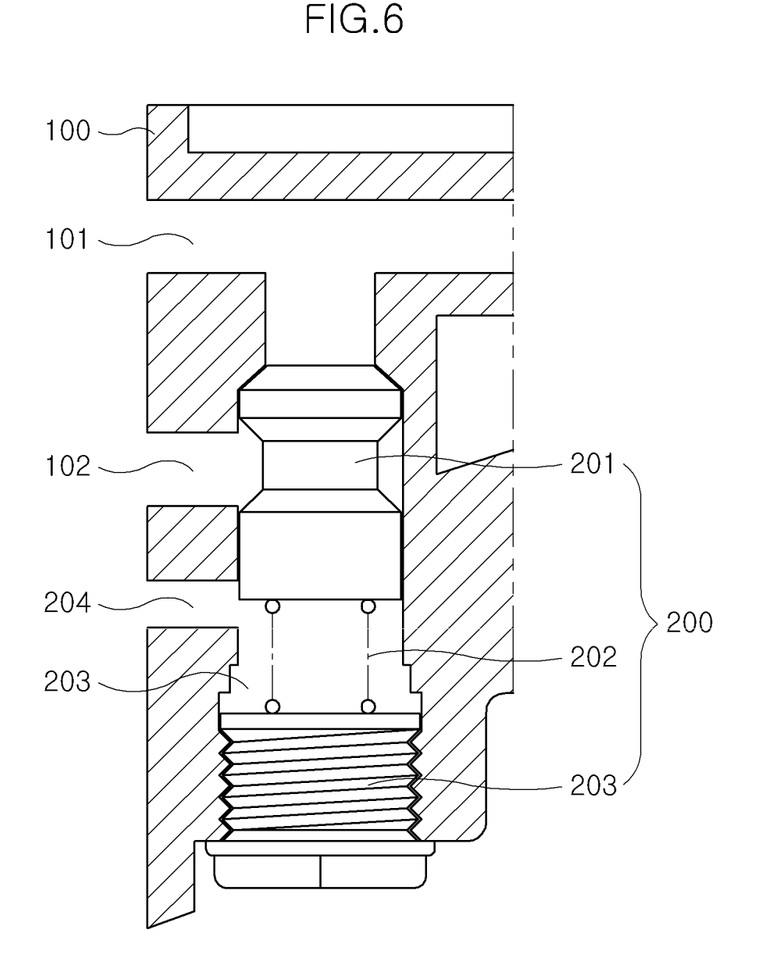
FIG. 6 is a view showing the configuration of a relief valve according to the related art.

FIG. 6 shows the configuration of a relief valve of the related art, in which a relief valve 200 of the related art includes a plunger 201 that is disposed at a return hole 102 that is formed in a housing 100, perpendicular to the path of a discharging hole 101 through which oil is discharged to the main gallery of an engine, and bypasses some of discharged oil, a spring 202 that elastically supports plunger 201 in a spring chamber 203 having an air vent hole 204 exposed to the atmosphere at a predetermined distance from return hole 102, and a plug 203 that is thread-fastened to spring chamber 203 and support spring 202.

Therefore, plunger 201 directly carries the discharging pressure of the oil that is pumped by the oil pump and discharged outside through discharging hole 101, and when the discharging pressure of the oil largely increases, plunger 101 is pushed, thereby opening return hole 102.

As return hole 102 is opened by plunger 101, some of the oil discharged out through discharging hole 101 is bypassed to return hole 102, such that it can return to the oil pump or the oil pan.

The discharging pressure of the oil supplied to the main gallery of the engine, through discharging hole 101, can be kept at appropriate pressure by the return of the oil according to bypass due to return hole 102.

Control of discharging pressure of the oil can prevent the oil filter and the oil cooler from being damaged even in the cold start of the engine in which the oil pressure of the oil pump becomes relatively high, and particularly, it is possible to prevent the oil pressure at the main gallery of the engine from excessively increasing even if the number of revolution of the oil pump increases.

Relief valve 200 has the advantage of being able to quickly control the discharging pressure of the oil discharged outside through discharging hole 101.

However, it is required to ensure a sufficient relief margin to achieve quick response of relief valve 200, and accordingly, it is possible to maintain the oil pressure at the main gallery of the engine at an appropriate level, that is, to keep lubrication stable.

The capacity of the oil pump should be increased to keep the lubrication stable and the increase in capacity of the oil pump necessarily increase loss of fuel efficiency because the driving torque increases.

Figure 7:
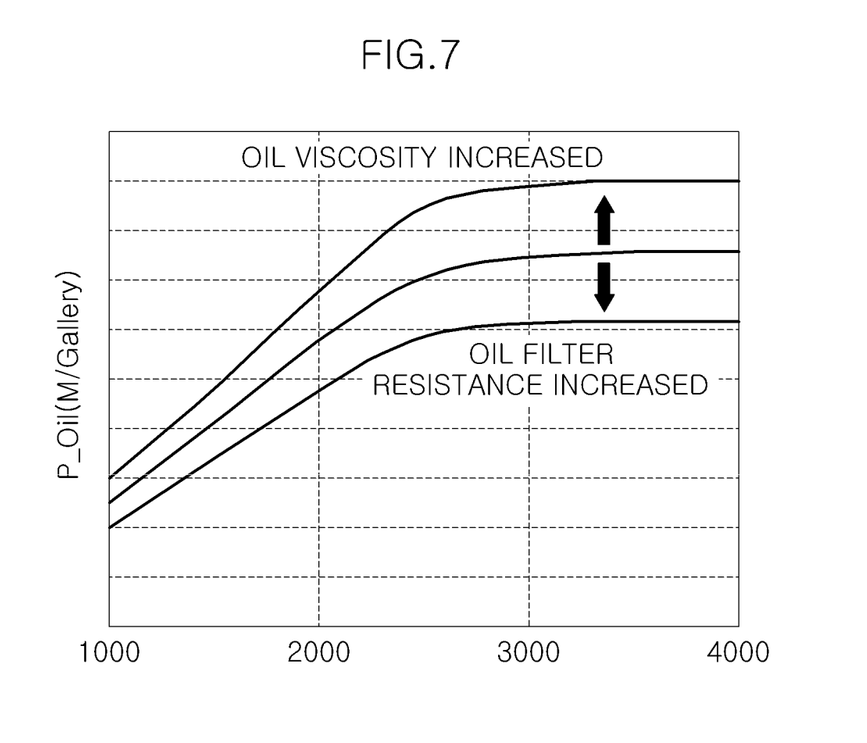
FIG. 7 is a diagram showing performance of the relief valve according to the related art shown in FIG. 6.

On the other hand, referring to FIG. 7 showing the property of oil that the viscosity increases at low temperature, it is difficult to keep appropriate oil pressure at the main gallery with relief valve 200 at relatively low oil temperature, such as in cold start or warm-up.

Further, relief valve 200 necessarily has a limit that it cannot appropriately control drop of oil pressure due to clogging of the oil filter for long-time use.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a relief valve for an oil pump that can prevent damage to a main gallery by greatly decrease peak pressure, using quick bypass flow according to oil pressure at the main gallery in cold start in which oil-discharging pressure is relatively higher at an oil pump than the main gallery, and can implement optimum discharging pressure control of the oil in warm up or even after warm up, by controlling discharging pressure of the oil pump, by making a bypass path due to direct influence of the oil pressure on the main gallery of the engine.

Various embodiments of the present invention provide a relief valve for an oil pump, including a plunger that divides a relief space defined in a housing into a housing chamber communicating with a main gallery of an engine and a plunger chamber communicating with an outlet of an oil pump discharging oil to the main gallery, and bypassing some of oil discharged from the main gallery to return, a coil spring that has a modulus of elasticity compressed under oil pressure of the main gallery which is relatively low in comparison to warm-up state of the engine, and elastically supports the plunger, and a locator that supports the coil spring such that the modulus of elasticity is changed by a change in seat position of the coil spring.

The plunger defines the housing chamber above a plunger body inserted in the relief space and defines the plunger chamber using at least one or more oil channels formed through the plunger body.

The oil channels may be symmetrically formed in pairs.

The coil spring may be partially inserted in a spring groove formed in the plunger and the spring groove may be formed at the lower portion of the plunger body of the plunger which may be inserted in the relief space.

The locator makes the seat position of the coil spring higher while expanded by supplied current.

The locator includes a heater that may be heated by current and an expandable substance that makes the seat position of the coil spring higher while expanded by heat from the heater.

The heater may be operated by a switch that supplies and cuts battery current.

The expandable substance may be wax or a substance with properties equivalent to wax.

The locator may be supported by a plug that may be coupled to the portion under the relief space and closes the relief space.

According to the exemplary embodiments of the present invention, since the discharging pressure of the oil pump is directly controlled by the oil pressure at the main gallery of an engine, it is possible to control the discharging pressure at a stable level even under a relative pressure difference between the oil pump and the main gallery.

In particular, according to the exemplary embodiments of the present invention, it is possible to prevent the main gallery from being damaged by largely decreasing peak pressure, by using quick bypass flow according to the oil pressure at the main gallery in cold start in which the discharging pressure of the oil pump is relatively higher than that of the main gallery, and to implement optimum discharging-pressure control of the oil in warm-up or even after warm-up.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
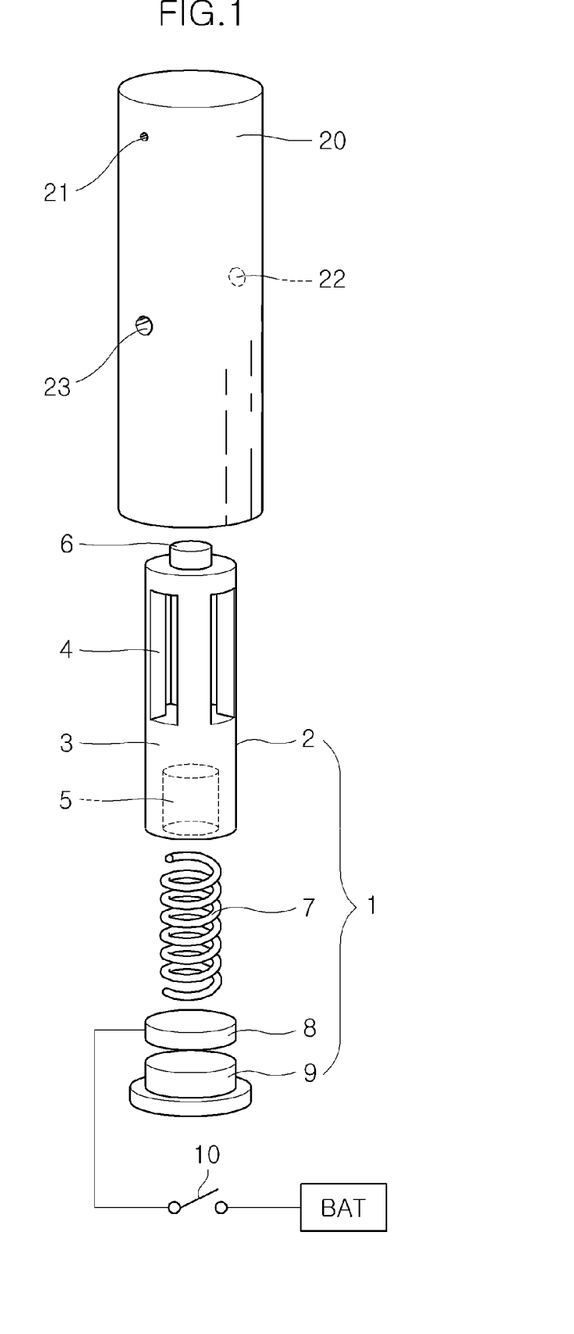
FIG. 1 is a view showing the configuration of a relief valve for an exemplary oil pump according to the present invention.

As shown in FIG. 1, a relief valve 1 for an oil pump according to various embodiments of the present invention includes a plunger 2 that is operated by oil pressure from a main gallery of an engine and decreases discharging pressure of an oil pump, a coil spring 7 that elastically supports plunger 2, a locator 8 that changes a modulus of elasticity by adjusting the height of the seat position of coil spring 7 by turning on/off a switch 10, and a plug 9 that supports and holds locator 8.

Plunger 2 has a cylindrical plunger body 3, oil channels 4 formed through plunger body 3, a spring groove 5 formed in the lower portion of plunger body 3, and a spacer boss 6 protruding upward from the top of plunger body 3.

At least one or more oil channels 4 are formed and four oil channels may be formed symmetrically at 90° intervals.

The modulus of elasticity of coil spring 7 should be set such that plunger 2 can be moved down even at smaller oil pressure Pa than normal oil pressure Pb of the main gallery of the engine.

The normal oil pressure Pb is oil pressure that is produced in the margin gallery when the engine is fully warmed up and the smaller oil pressure Pa is oil pressure that is produced in the main gallery before the engine is fully warmed up and in cold start.

The smaller oil pressure Pa has a pressure value lower than the discharging pressure of the oil pump.

Locator 8 is equipped with a heater filled with an expandable substance and increasing temperature, using battery current supplied by the operation of switch 10, in which the expandable substance is wax.

Although the expandable substance is limited as wax in the exemplary embodiment, actually, it is not limited to wax and all other expandable substances, similar to wax, can be used.

Figure 2:
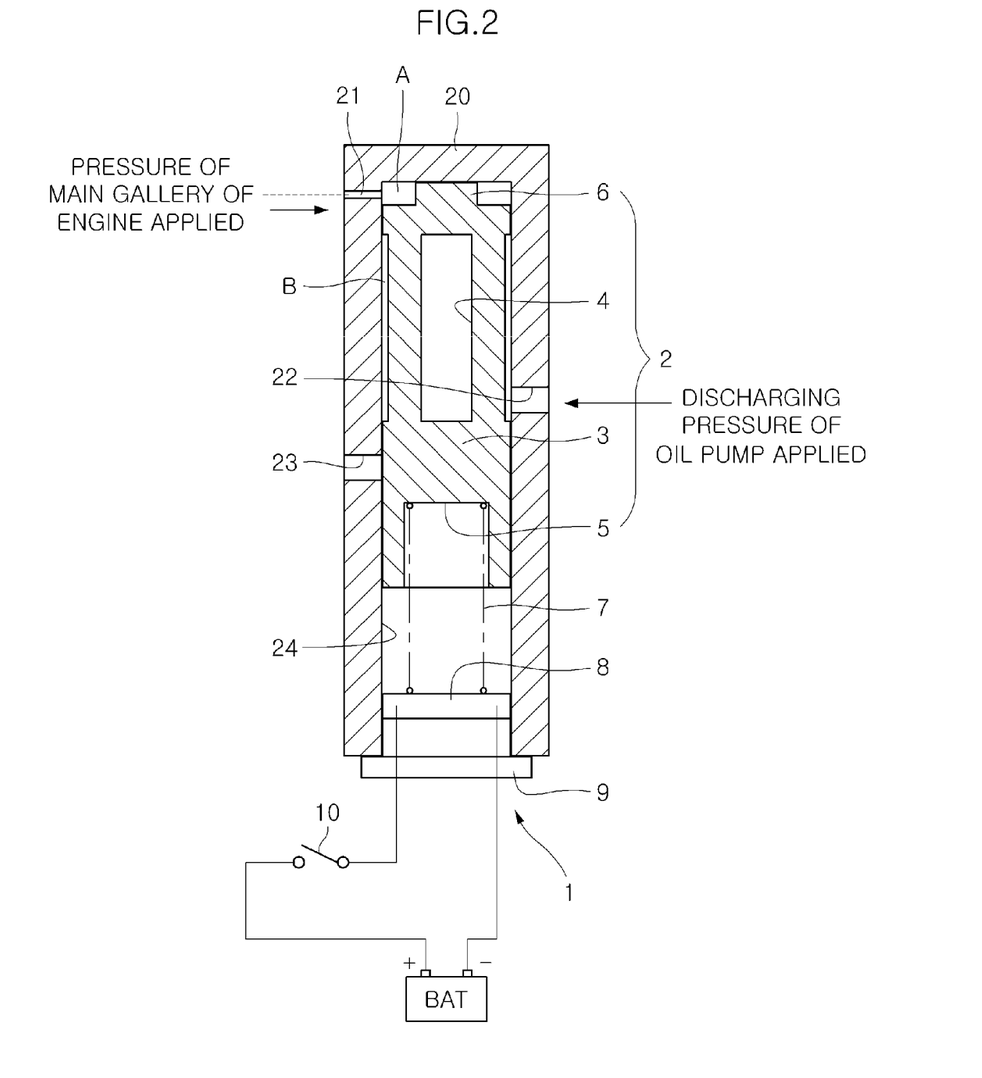
FIG. 2 is an assembly cross-sectional view showing the inside of an exemplary oil pump housing of the relief valve according to the present invention.

FIG. 2 is an assembly cross-sectional view showing the inside of an oil pump housing of the relief valve according to various embodiments of the present invention.

As shown in the figure, a relief space, which communicates with an outlet through which the pumped oil is discharged to the main gallery of the engine and bypasses some of the oil at high discharging pressure, is defined in housing 20 and relief valve 1 is disposed in the relief space.

The relief space is composed of an operational hole 21 that the oil pressure of the main gallery of the engine is applied to, a return hole 22 that the discharging pressure of the oil pump, which is supplied from the oil pump to the main gallery of the engine, is applied to, a bypass hole 23 that decreases the pressure at the outlet of the oil pump by bypassing the oil flowing in return hole 22 to the oil pump or the oil pan, and a space accommodating relief valve 1, in which operational hole 21, return hole 22, and bypass hole 23 are formed in a housing cylinder 24.

Return hole 22 is positioned between operational hole 21 and bypass hole 23, the vertical height between operational hole 21 and bypass hole 23 is larger than the vertical length of oil channels 4 of plunger 2, and the vertical height between operational hole 21 and return hole 22 is smaller than vertical length of oil channels 4 of plunger 2.

In the exemplary embodiment, when relief valve 1 is inserted in the relief space of housing cylinder 24, the relief space is divided into two chambers by the structure of plunger 2 of relief valve 1.

That is, a housing chamber A using the upper portion of plunger 2 is defined at the upper portion of the relief space and a plunger chamber B is defined in the other space, except for housing chamber A, in the relief space.

Operational hole 21 is positioned in housing chamber A while return hole 22 and bypass hole 23 that communicate with oil channels 4 of plunger body 3 are positioned in plunger chamber B.

Accordingly, the oil pressure at the main gallery of the engine, which is applied to plunger 2, is exerted in housing chamber A, while bypass flow allowing the oil at the outlet of the oil pump which is discharged to the main gallery to return to the oil pump or the oil pan is made in plunger chamber B, and elastic support force of coil spring 7 is applied to plunger 2 against the pressure in housing chamber A.

FIG. 2 shows when relief valve 1 disposed in the relief space of housing 2 does not operate, that is, oil pressure is not applied and switch 10 that supplies battery current to locator 8 has been turned off.

Accordingly, only the elastic force of coil spring 7 is applied to plunger 2 of relief valve 1 and the position of plunger 2 has been fixed by the elastic force of coil spring 7.

With relief valve 1 in the position described above, housing chamber A communicates with the main gallery through operational hole 21 and plunger chamber B communicates with the outlet of the oil pump through return hole 22, while bypass hole 23 is blocked by plunger 2.

Figure 3:
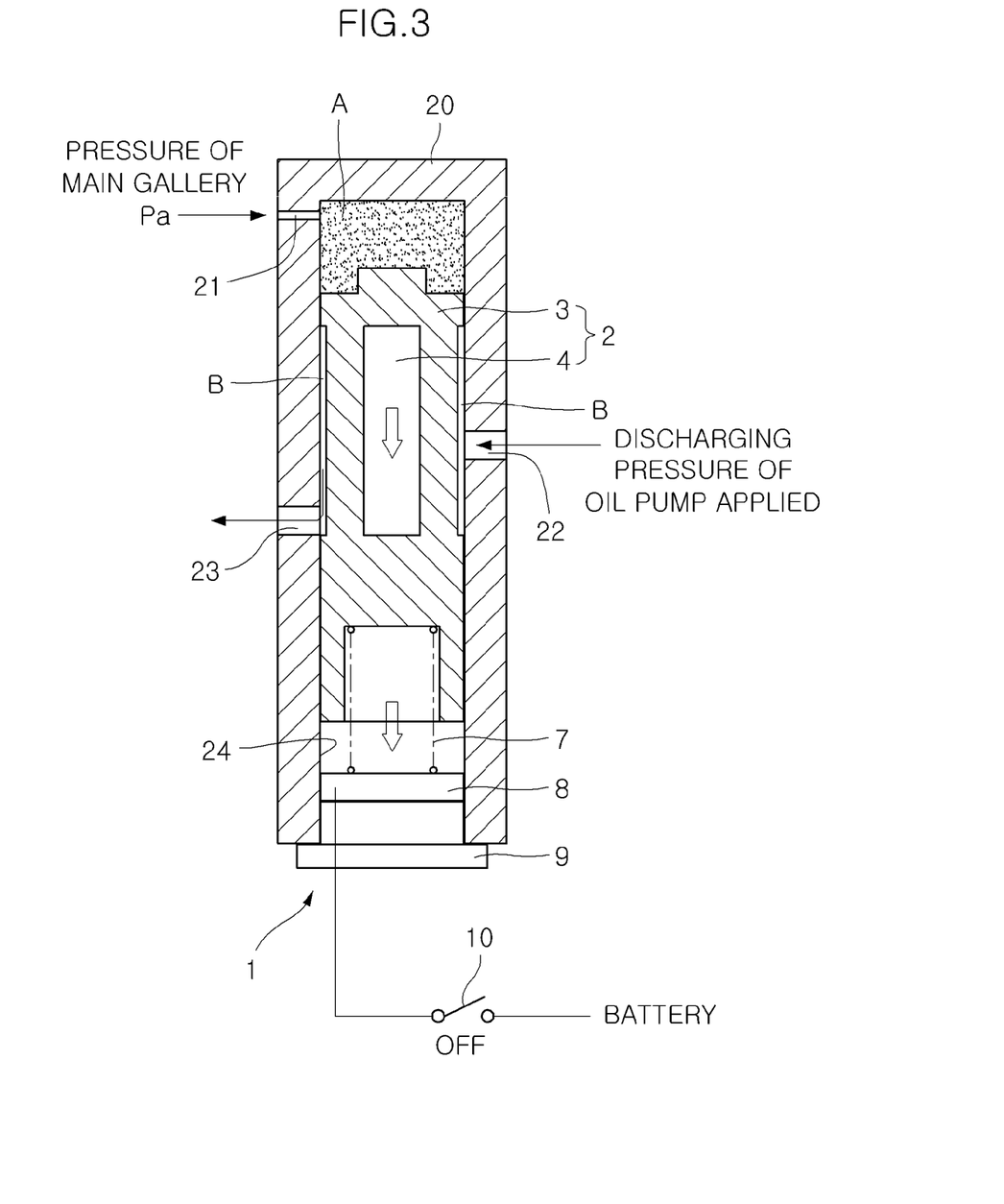
FIGS. 3 to 5 are views showing the operation of an exemplary relief valve according to the present invention.

FIG. 3 is a view showing the operation of the relief valve according to various embodiments of the present invention, in cold start of the engine.

In the figure, the oil pressure of the main gallery gradually increases after the engine is cold-started, such that the pressure produced in housing chamber A is gradually increased by oil pressure Pa of the main gallery which is transmitted through operational hole 21 and applied only to plunger 2, while only the elastic support force of coil spring 7 that elastically support plunger 2 is exerted in plunger chamber B.

In this state, the seat position of coil spring 7 elastically supporting plunger 2 is kept at the initial state, which is because switch 10 has been turned off and locator 8 is not activated, in the cold start.

As coil spring 7 is held at the initial seat position, coil spring 7 can have a modulus of elasticity that can make compressive deformation even under lower pressure than normal pressure Pb of the main gallery which is produced when the engine is fully warmed up.

That is, coil spring 7 that is held at the initial seat position by inactivity of locator 8 has the lowest modulus of elasticity.

Therefore, plunger 2 moves only when the pressure in housing chamber A which increases with the increase in oil pressure of the main gallery is larger than the elastic support force of coil spring 7, such that relief valve 1 does not operate when the pressure in housing chamber A is not larger than the elastic support force of coil spring 7.

However, when oil pressure Pa above the modulus of elasticity of coil spring 7 is produced in the main gallery by continuous oil-sending of the oil pump, oil pressure Pa is applied to housing chamber A, such that plunger 2 moves down to plunger chamber B while compressing coil spring 7.

As plunger 2 is moved by increase in oil pressure in housing chamber A, plunger chamber B extends to bypass hole 23 across return hole 22.

In this state, the oil discharged through the outlet of the oil pump flows into plunger chamber B through return hole 22 together with the oil flow supplied to the main gallery, such that oil flow coming out through bypass hole 23 is formed.

The oil coming out through bypass hole 23 returns to the oil pump or the oil pan.

As described above, since plunger 2 moves while compressing coil spring 7 when the oil pressure of the main gallery becomes higher to the oil pressure Pa above the elastic force of coil spring 7, relief valve 1 returns some of the oil coming out through the outlet of the oil pump to the oil pump or the oil pan.

The oil pump can decrease the discharging pressure of the oil coming out of the oil pump by the bypass flow.

Therefore, relief valve 1 that operates in cold start of an engine can prevent the main gallery from being damaged by appropriately decreasing the discharging pressure of the oil pump which is relatively high in the cold start, and particularly, can largely decrease peak pressure of the oil pump, by generating bypass flow associated with the increase in oil pressure of the main gallery, by using the modulus of elasticity of coil spring 7 at the lowest seat position due to inactivity of locator 8.

Figure 4:
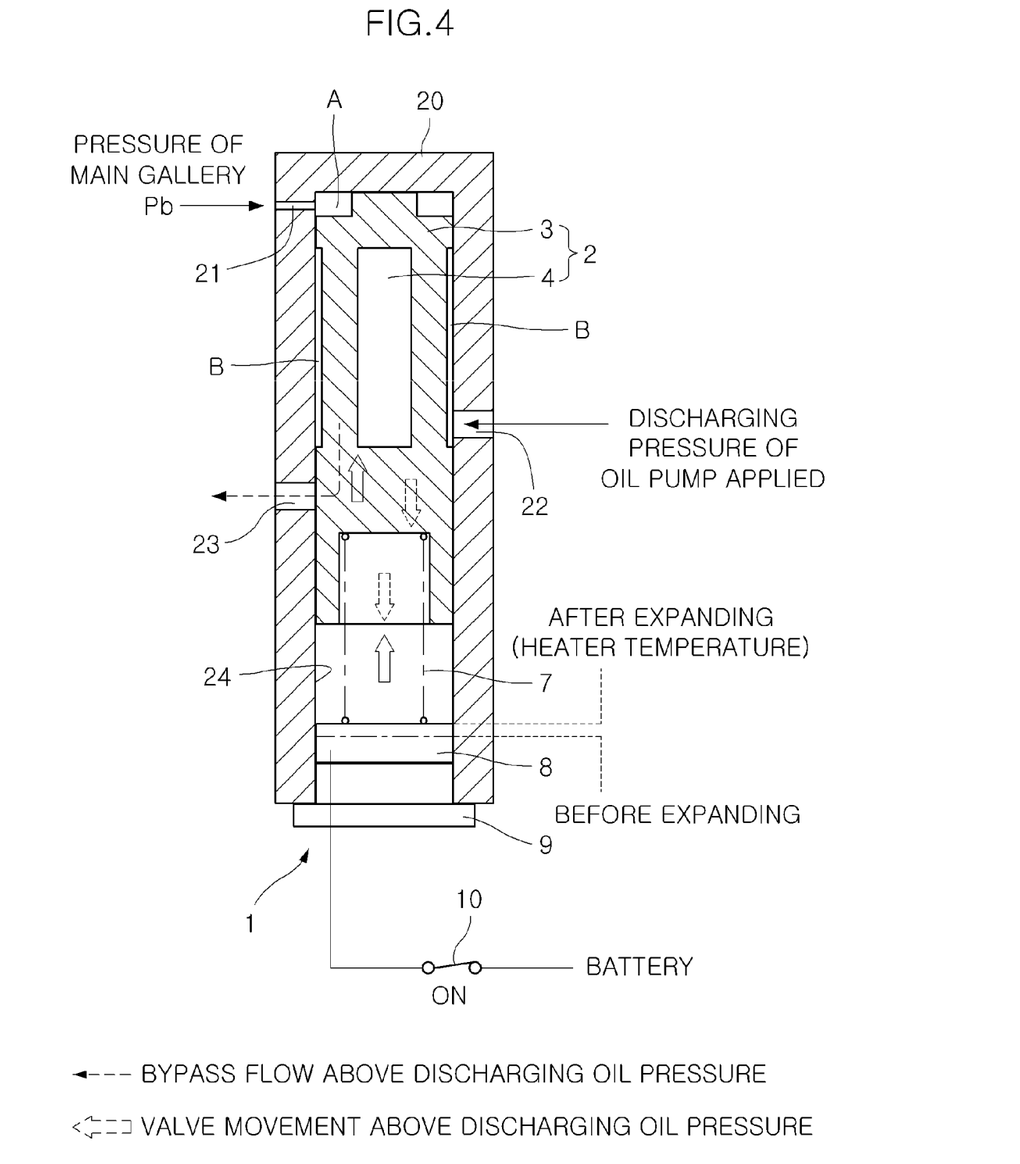

FIG. 4 shows when an engine is cold-started and warmed up and normal oil pressure Pb is produced in the main gallery, in which switch 10 has been turned on and locator 8 is activated due to expansion of wax by the heater receiving the battery current.

As locator 8 is activated, the seat position of coil spring 7 becomes higher than that in the inactivity of locator 8, such that the oil pressure of housing chamber A which compresses coil spring 7 becomes higher than the oil pressure in cold start.

The solid-line arrow in FIG. 4 shows that the oil pressure in housing chamber A is not larger than the elastic force of coil spring 7 elastically supporting plunger 2, such that plunger 2 does not move.

In this state, the oil is kept supplied to the main gallery from the oil pump and the supply continues until normal oil pressure Pb is produced in the main gallery.

However, as shown by a dotted-line arrow in FIG. 4, when oil pressure of the main gallery that is larger than normal oil pressure Pb is applied to housing chamber A through operational hole 21, plunger 2 where the oil pressure in housing chamber A is applied moves while compressing coil spring 7, such that plunger chamber B extends to bypass hole 23 across return hole 22.

In this state, the oil discharged through the outlet of the oil pump flows into plunger chamber B through return hole 22 together with the oil flow supplied to the main gallery, such that oil flow coming out through bypass hole 23 is formed.

The oil coming out through bypass hole 23 returns to the oil pump or the oil pan.

As described above, since plunger 2 moves while compressing coil spring 7 when the oil pressure of the main gallery becomes higher than the modulus of elastic force of coil spring 7 with the seat position changed, relief valve 1 returns some of the oil coming out through the outlet of the oil pump to the oil pump or the oil pan.

The oil pump can decrease the discharging pressure of the oil coming out of the oil pump by the bypass flow.

Therefore, relief valve 1 that operates when the engine is warmed up can prevent the main gallery from being damaged by high discharging pressure of the oil pump, by generating the bypass flow against the increase in oil pressure of the main gallery which is higher than normal oil pressure Pb, by using the modulus of elasticity of coil spring 7 with the seat position changed higher by activation of locator 8.

Figure 5:
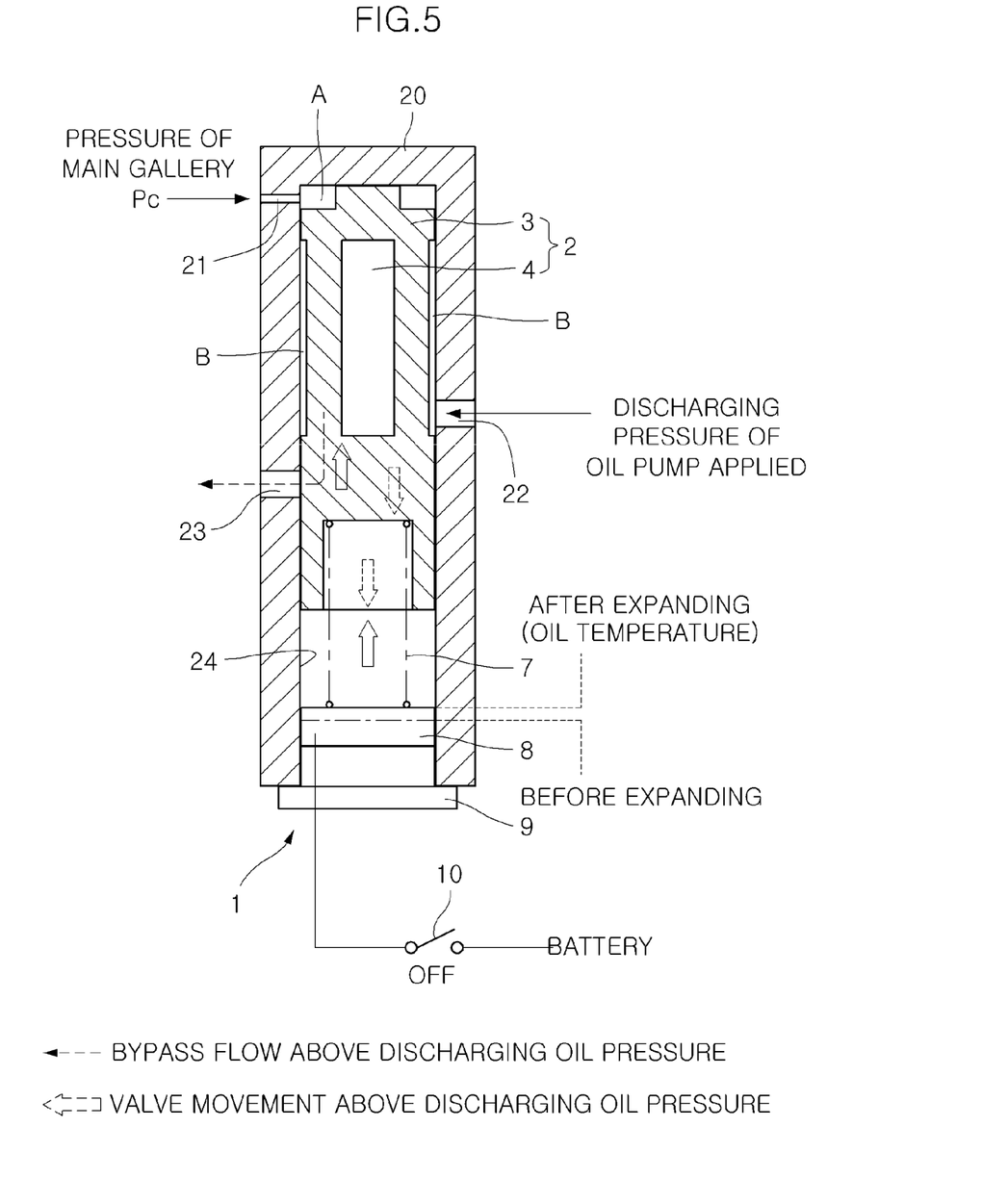

FIG. 5 is a view showing the operation of the relief valve according to various embodiments of the present invention when the engine has been fully warmed up.

In the state shown in the figure, the wax has been expanded by the oil that has been heated by fully warm-up of the engine and locator 8 has been activated by the expansion of the wax, and the seat position of coil spring has been moved up.

That is, although the battery current supplied to locator 8 is cut by turning-off of switch 10, locator 8 is activated by the wax that is expanded by the oil, such that plunger 2 make the same operation as that shown in FIG. 4 in which switch 10 has been turned on.

Therefore, the full warm-up state of the engine shown in FIG. 5 is different from the non-full warm-up state in oil pressure Pc of the main gallery which is applied to housing chamber A in FIG. 4, but all the operational conditions, the operation, and the effect are implemented in the same way.

As described above, relief valve 1 according to various embodiments of the present invention can control the oil pressure of the main gallery, which changes in accordance with the operational conditions of the engine, in a stable and optimum state, by changing the modulus of elasticity by heightening/lowering the seat position of coil spring 7 with locator 8 that is operated by a substance, which is expanded by heat, in accordance with the oil pressure of the main gallery.

That is, it is possible to prevent the main gallery from being damaged in cold start of an engine by largely decreasing peak pressure of an oil pump, by using bypass flow generated by the oil pressure of the main gallery, and to control the discharging pressure of the oil pump at the optimum level when the engine is warmed up.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A relief valve for an oil pump, comprising:
    a plunger that divides a relief space defined within a housing into a housing chamber communicating with a main gallery of an engine and a plunger chamber communicating with an outlet of an oil pump discharging oil to the main gallery and bypassing some of oil discharged from the main gallery to return;
    a coil spring that has a modulus of elasticity that is compressed under oil pressure of the main gallery which is relatively low in comparison to a warm-up state of the engine, and which elastically supports the plunger; and
    a locator that supports the coil spring such that the modulus of elasticity is changed by a change in a seat position of the coil spring;
    wherein the locator makes the seat position of the coil spring higher while expanded by supplied current; and
    wherein the locator includes a heater that is heated by current and an expandable substance that makes the seat position of the coil spring higher while expanded by heat from the heater.

2. The relief valve for an oil pump as defined in claim 1, wherein the plunger defines the housing chamber above a plunger body inserted in the relief space and defines the plunger chamber using at least one or more oil channels formed through the plunger body.

3. The relief valve for an oil pump as defined in claim 2, wherein the oil channels are symmetrically formed in pairs.

4. The relief valve for an oil pump as defined in claim 1, wherein the coil spring is partially inserted in a spring groove formed in the plunger.

5. The relief valve for an oil pump as defined in claim 4, wherein the spring groove is formed at the lower portion of the plunger body of the plunger which is inserted in the relief space.

6. The relief valve for an oil pump as defined in claim 1, wherein the heater is operated by a switch that supplies and cuts battery current.

7. The relief valve for an oil pump as defined in claim 1, wherein the expandable substance is wax or a substance with properties equivalent to wax.

8. The relief valve for an oil pump as defined in claim 1, wherein the locator is supported by a plug that is coupled to the portion under the relief space and closes the relief space.

\* \* \* \* \*